United States Patent [19]

Hutchinson

[11] 3,868,431

[45] *Feb. 25, 1975

[54] ELASTOMER PRODUCTION

[75] Inventor: Francis Gowland Hutchinson, Runcorn, England

[73] Assignee: Imperial Chemical Industries Limited, London, England

[ * ] Notice: The portion of the term of this patent subsequent to Oct. 24, 1989, has been disclaimed.

[22] Filed: Apr. 19, 1973

[21] Appl. No.: 352,690

[52] U.S. Cl. ...... 260/859 R, 260/2.5 A, 260/37 AL, 260/37 N, 260/40 TN, 260/42, 260/75 TN, 260/75 NE, 260/77.5 CR
[51] Int. Cl............................................. C08g 41/04
[58] Field of Search..................................... 260/859

[56] References Cited
UNITED STATES PATENTS

| 2,806,836 | 9/1957 | Nischk | 260/859 |
|---|---|---|---|
| 2,879,248 | 3/1959 | Nischk | 260/859 |
| 3,008,917 | 11/1961 | Park | 260/859 |
| 3,047,530 | 7/1962 | Nischk | 260/859 |
| 3,509,234 | 4/1970 | Burlant | 260/859 |
| 3,700,752 | 10/1972 | Hutchinson | 260/859 |

FOREIGN PATENTS OR APPLICATIONS

| 956,720 | 1/1957 | Germany | 260/859 |
|---|---|---|---|
| 1,158,602 | 6/1958 | France | 260/859 |
| 971,199 | 12/1958 | Germany | 260/859 |
| 1,073,135 | 1/1960 | Germany | 260/859 |
| 1,126,602 | 3/1962 | Germany | 260/859 |
| 39-25,195 | 11/1962 | Japan | 260/859 |

Primary Examiner—Paul Lieberman
Attorney, Agent, or Firm—Cushman, Darby & Cushman

[57] ABSTRACT

A process for the production of an elastomeric material from a homogeneous composition comprising from 50% to 95% by weight of the precursors of a cross-linked elastomeric polyurethane and from 50% to 5% by weight of a polymerisable ethylenically unsaturated material, in which the reaction of the polyurethane precursors is substantially completed before polymerisation of the ethylenically unsaturated material is allowed to proceed to the extent that the polymer so produced forms a separate phase, polymerisation of the ethylenically unsaturated material thereafter being completed, and in which the ethylenically unsaturated material contains at least one polyfunctional ethylenically unsaturated material and is selected so as to produce, after polymerisation, a cross-linked polymer having on average a molecular weight between cross-links of not greater than 2500.

10 Claims, No Drawings

ELASTOMER PRODUCTION

This invention relates to a process for the production of an elastomeric material comprising a cross-linked polyurethane and a polymer of an ethylenically unsaturated material, and to an elastomeric material made by said process, and is a modification of the invention described in our British Pat. Specification No. 1,239,701.

In the aforementioned specification, the disclosure of which is incorporated herein, we have described and claimed a process for the production of a polymeric material from a homogeneous composition comprising from 5% to 95% by weight of the precursors of a cross-linked polyurethane and from 95% to 5% by weight of at least one vinyl monomer, in the process the gelation of the polyurethane being substantially completed before polymerisation of the vinyl monomer is allowed to proceed to the extent that the vinyl polymer so produced forms a separate phase, and thereafter completing polymerisation of the vinyl monomer. We found that this process resulted in articles having improved properties when compared with the properties of articles prepared by simultaneously gelling the polyurethane and polymerising the vinyl monomer.

The precursors of the cross-linked polyurethane used in the production of the aforementioned polymeric material may be such as to be capable of forming an elastomeric polyurethane and we found, particularly where such polyurethane precursors were used and especially where they were used at relatively low concentrations, that the articles produced by the process had improved impact strengths when compared with the impact strengths of articles made from the vinyl polymer alone.

Where the precursors used in the production of the aforementioned articles are such as to form an elastomeric polyurethane and the article contains a relatively high concentration of polyurethane then the article is an elastomer which generally has improved properties, e.g. improved tensile modulus and tensile strength, when compared with the properties of the elastomer prepared in the absence of vinyl monomer.

We have now found that where, in the process described and claimed in the aforementioned specification, at least one polyfunctional ethylenically unsaturated material is used, that is, a material which on polymerisation results in the production of a cross-linked polymer, and provided the amount of cross-linking is in a defined range, then the resultant elastomeric material may show a decrease in permanent set and may show a more linear stress-strain relationship when compared with an elastomeric material made using only a monofunctional ethylenically unsaturated material, that is when using a material which on polymerisation results in the production of an uncross-linked polymer.

According to the present invention there is provided a process for the production of an elastomeric material from a homogeneous composition comprising from 50% to 95% by weight of the precursors of a cross-linked polyurethane and from 50% to 5% by weight of at least one polymerisable ethylenically unsaturated material in said process the reaction of the polyurethane precursors being substantially completed before polymerisation of the ethylenically unsaturated material is allowed to proceed to the extent that the polymer so produced forms a separate phase, polymerisation of the ethylenically unsaturated material thereafter being completed, in which the precursors, when reacted alone in the absence of the ethylenically unsaturated material, are capable of forming an elastomeric polyurethane having a glass-rubber transition temperature (Tg) of 25° C or less and in which the ethylenically unsaturated material contains at least one polyfunctional ethylenically unsaturated material and is selected so as to produce, after polymerisation, a cross-linked polymer having on average a molecular weight between cross-links of not greater than 2,500.

By polyfunctional ethylenically unsaturated material we mean a material containing two or more polymerisable ethylenically unsaturated groups. Suitably, the polyfunctional ethylenically unsaturated material comprises at least one ethylenically unsaturated monomer at least one of which monomers is polyfunctional. The ethylenically unsaturated groups may suitably be present in the monomer as terminal groups. The ethylenically unsaturated material, which will hereinafter be referred to as the ethylenically unsaturated monomer, may comprise a mixture of at least one monofunctional ethylenically unsaturated monomer and at least one polyfunctional ethylenically unsaturated monomer. Because the ethylenically unsaturated monomer consists of or includes at least one polyfunctional monomer, polymerisation of the monomer results in the production of a cross-linked polymer.

The molecular weight between cross-links (Mc) in the cross-linked polymer produced by polymerisation of the ethylenically unsaturated monomer or monomers is the average Mc in the polymer which would theoretically be produced by polymerisation of the monomer or mixture of monomers. Although the monomer or mixture of monomers may be chosen so as to produce in theory a desired average Mc the actual average Mc in the polymer which is produced may be different from the theoretical average Mc. Thus, we believe that during polymerisation of the ethylenically unsaturated monomer cross-links between the macromolecular chains of the resultant polymer may be produced by grafting in addition to those formed by polymerisation of the polyfunctional monomer and in this case the actual average Mc may be lower than the average Mc which would theoretically be produced.

Choice of the amounts of monomer or monomers to be used to give the desired average Mc depends on the molecular weights of the monomers and on the functionality, and hence the number of cross-links points per molecule, of the monomers.

For example, equal parts by mole of a monofunctional ethylenically unsaturated monomer having a molecular weight of 100 and a difunctional ethylenically unsaturated monomer having a molecular weight of 100, which latter monomer contains one cross-link point per molecule, yield a polymer having an average Mc of 200. A mixture of the aforementioned monomers in a proportion of 4:1 by mole yields an average Mc of 500. Similarly, a mixture of four parts by mole of a monofunctional ethylenically unsaturated monomer having a molecular weight of 200 and one part by mole of a trifunctional ethylenically unsaturated monomer having a molecular weight of 50, which latter monomer contains two cross-link points per molecule, yields a polymer having an average Mc of 425.

The average Mc in the cross-linked polymer is preferably in the range 100 to 2,000 as within this range the elastomeric materials produced in the process of this invention generally have higher tensile moduli and lower permanent set than elastomeric materials in which the Mc in the cross-linked polymer is outside this range. Most preferably, the average Mc is in the range 100 to 1,000.

Suitable polyfunctional ethylenically unsaturated monomers include polyvinyl aromatic hydrocarbons, for example, divinyl benzene, trivinyl benzene, divinyl toluene, divinyl naphthalene, and unsaturated esters, for example esters of acrylic or methacrylic acids and polyols, e.g. esters of acrylic or methacrylic acids and diols, that is acrylate or methacrylate bis-esters of diols. For example, the unsaturated ester may be a bis-ester of acrylic or methacrylic acid with a glycol of formula $HO-(CH_2)_n-OH$, where $n$ is a whole number in the range 2 to 10, e.g. ethylene glycol dimethacrylate. Another suitable difunctional monomer is diallyl phthalate.

The polyfunctional ethylenically unsaturated monomer may be used in admixture with at least one monofunctional ethylenically unsaturated monomer. Suitable monofunctional monomers are the vinyl monomers described in the aforementioned British Pat. Specification No. 1,239,701.

The precursors of the cross-linked polyurethane, which are preferably free of groups reactive with the polymerisable ethylenically unsaturated material, should be capable of reacting in the absence of ethylenically unsaturated monomer to yield a cross-linked elastomeric polyurethane having a Tg of 25° C or less. Furthermore, in the elastomeric material formed in the process of our invention the crosslinked polyurethane component in the material should have a Tg of 25° C or less.

The glass-rubber transition temperature is readily measured, for example, using a Du Pont 900 Thermal Analyser at a rate of heating of 20° C per minute, or by using a Torsion Pendulum at 1 cycle per second.

The polyurethane precursors may comprise at least one polyfunctional compound containing isocyanate-reactive groups and at least one polyisocyanate. As the precursors should be capable of forming a cross-linked polyurethane the functionality of at least one of the polyfunctional compounds and/or at least one of the polyisocyanates should be greater than two.

Suitable isocyanate-reactive groups include, for example, $-OH$, $-COOH$ and $-NH_2$ groups. For example, the polyfunctional compound may be a polyester containing $-OH$ and/or $-COOH$ groups. The polyfunctional compound may be a polyol, for example, a diol or a triol or a polyether polyol. If desired mixtures of two or more polyfunctional compounds may be used, e.g. a mixture of a diol or a triol.

The polyisocyanate in the polyurethane precursors may be difunctional or trifunctional or of even higher functionality. The polyisocyanate may be aliphatic, cycloaliphatic or aromatic or may contain in the same polyisocyanate molecule aliphatic and aromatic isocyanate groups, aliphatic and cycloaliphatic isocyanate groups, cycloaliphatic and aromatic isocyanate groups, or even aliphatic, cycloaliphatic and aromatic isocyanate groups. If desired, mixtures of two or more different polyisocyanates may be used.

Preferably, the Tg of the elastomeric cross-linked polyurethane capable of being formed from the precursors therefor is 0° C or less and furthermore the Tg of the crosslinked polyurethane component in the elastomeric material formed in the process of our invention is preferably 0° C or less.

The selection of suitable precursors capable of forming a cross-linked elastomeric polyurethane having a Tg of 25° C or less, and preferably 0° C or less, will present no difficulty to the man skilled in the art of polyurethane chemistry and technology. The precursors may be selected so as to produce an amorphous or a crystalline polyurethane elastomer. In general, where a given polyfunctional compound is reacted with a polyisocyanate to produce a cross-linked polyurethane the Tg of the resultant polyurethane depends on the nature of the polyisocyanate used and will decrease in the following order 4:4'-diphenylmethane diisocyanate > toluene diisocyanate > hexamethylene diisocyanate. Furthermore, the lower the cross-link density in the cross-linked polyurethane then in general the lower will be the Tg of the polyurethane and, for a polyurethane produced from a given polyisocyanate, the lower will the Tg of the polyurethane be the higher is the molecular weight of the polyfunctional compound.

Suitable polyfunctional compounds and polyisocyanates for use as polyurethane precursors are described in the aforementioned British Pat. Specification No. 1,239,701 although it must be remembered that the precursors must be selected so as to be capable of producing a polyurethane having a Tg of 25° C or less, and preferably 0° C or less.

In the process of our invention the polyurethane precursors in the homogeneous composition should be reacted substantially to completion before polymerisation of the ethylenically unsaturated monomer has proceeded to the extent that the thus formed polymer forms a separate phase, and thereafter the polymerisation of the ethylenically unsaturated monomer should be completed.

By homogeneous composition we mean a composition in which there is no gross phase separation visible to the unaided eye although we do not exclude the possibility of there being a slight haziness in the composition.

Conditions suitable for use in the process of our invention are described in the aforementioned British Pat. Specification No. 1,239,701.

As in general it can be arranged for polyurethane precursors to be reacted at relatively low temperature and for ethylenically unsaturated monomers to remain unreactive at low temperatures and to be polymerised at relatively high temperature, the process of our invention is most easily effected by suitable adjustment of the temperature throughout the process. Thus, it is preferred to effect the reaction of the precursors of the cross-linked polyurethane and thereafter to polymerise the ethylenically unsaturated monomer at a temperature higher than that at which the reaction of the precursors is effected.

The reaction of the polyurethane precursors may be assisted by catalysts, for example, tertiary amines and metal salts, e.g. stannous octoate and dibutyl tin dilaurate.

If desired, the nature of the composition may be arranged so that the reaction of the polyurethane precursors may be effected at about ambient temperature, e.g. at or below 30° C, and polymerisation of the ethylenically unsaturated monomer at elevated temperatures, e.g. at a temperature of 40° C or higher, preferably 50° C or higher, and more preferably between 50° C and 120° C. However, such a procedure is not essential in order to effect the process of our invention in the desired manner. By suitable choice of catalysts and inhibitors the sequential reaction of the polyurethane precursors and polymerisation of the ethylenically unsaturated material may be effected at the same or at substantially the same temperature.

Thus, if desired, a polymerisation inhibitor may be included in the composition to reduce the amount of, or delay the onset of, polymerisation of the ethylenically unsaturated monomer during reaction of the polyurethane precursors, particularly if reaction of the polyurethane precursors is effected above ambient temperature.

Polymerisation of the ethylenically unsaturated monomer may be assisted by a polymerisation initiator. The temperature at which it is to be polymerised and the nature of the initiator to be used depend on the ethylenically unsaturated monomer used.

Suitable initiators are described in the aforementioned specification.

The composition may be shaped in any suitably shaped mould, the shaping being effected before reaction of the polyurethane precursors has proceeded to the extent that the composition is no longer sufficiently fluid to be shaped. Preferably, the fluid composition is charged to a suitably shaped mould at a stage where little if any reaction of the polyurethane precursors in the composition has taken place.

In order that the polymer of the ethylenically unsaturated monomer should have a substantial effect on the properties of the elastomeric material of our invention it is preferred that the composition used in the process of our invention should comprise greater than 10% by weight of at least one ethylenically unsaturated monomer and correspondingly less than 90% by weight of cross-linked polyurethane precursors. It is further preferred that the composition used in the process comprises greater than 70% by weight of cross-linked polyurethane precursors and correspondingly less than 30% by weight of at least one ethylenically unsaturated monomer.

The elastomeric materials of our invention may contain stabilisers, e.g. antioxidants and antiozonants, and ultraviolet stabilisers. The elastomeric materials may also contain particulate filler materials, e.g. carbon black and calcium carbonate, and oil extenders. The stabilisers, particulate filler materials and oil extenders are desirably mixed with the composition comprising cross-linked polyurethane precursors and ethylenically unsaturated monomer before reaction of the precursors has commenced, and in any event the stabilisers, particulate filler materials and oil extenders should be added to the composition before reaction of the precursors has proceeded to the extent that the stabilisers, particulate filler and oil extenders can no longer be thoroughly mixed with the composition.

The invention is now illustrated by the following Examples in which all parts are expressed as parts by weight.

EXAMPLE 1

A. 20 parts of oxypropylated trimethylol propane having a molecular weight of 3,000 and a hydroxyl value of 56 mg KOH g$^{-1}$, 20 parts of poly(propylene glycol) having a molecular weight of 2,000 and a hydroxyl value of 56 mg KOH g$^{-1}$ and 5.3 parts of 4:4'-diphenylmethane diisocyanate were mixed at 60° C and to the resultant solution there was added 18.2 parts of ethylene glycol dimethacrylate (containing 100 ppm of quinol), 0.2 part of t-butyl peroctoate and 0.05 part of dibutyl tin dilaurate. The solution was degassed and charged to a mould formed by a pair of 12 in. × 12 in. glass plates separated by a one-sixteenth in. deep gasket and heated at 60° C for 4 hours to effect the polyurethane reaction. Thereafter the mould and contents were heated at 80° C for 18 hours and 115° C for 2 hours in order to polymerise the ethylene glycol dimethacrylate.

The elastomeric sheet removed from the mould had the properties shown at A in the following table.

B. The procedure of experiment A above was repeated except that 30.2 parts of ethylene glycol dimethacrylate were used. The properties of the elastomeric sheet removed from the mould are shown at B in the following table.

C. By way of comparison and to show the effect of the absence of cross-linking in the polymer of the ethylenically unsaturated monomer the procedure of experiment A above was repeated except that 18.2 parts of methyl methacrylate were used in place of the ethylene glycol dimethacrylate. The properties of the elastomeric sheet removed from the mould are shown at C in the following table.

D. By way of comparison and to show the effect of the absence of cross-linking in the polymer of the ethylenically unsaturated monomer the procedure of experiment A above was repeated except that 30.2 parts of methyl methacrylate were used in place of the ethylene glycol dimethacrylate. The properties of the elastomeric sheet removed from the mould are shown at D in the following table.

E. By way of further comparison and in order to show the properties of the cross-linked elastomeric polyurethane in the absence of a polymer of an ethylenically unsaturated monomer the procedure of experiment A above was repeated except that the ethylene glycol dimethacrylate and the t-butyl peroctoate were omitted and 0.003 part of dibutyl tin dilaurate were used. After charging the solution to the mould the contents were heated at 80° C for 16 hours and 115° C for 2 hours.

The properties of the amorphous elastomeric material removed from the mould are shown at E in the following table.

| Experiment | A | B | C | D | E |
|---|---|---|---|---|---|
| Weight % polyurethane | 71.3 | 60 | 71.3 | 60 | 100 |
| Weight % polymer of ethylenically unsaturated monomer | 28.7 | 40 | 28.7 | 40 | 0 |
| Mc in polymer of ethylenically unsaturated monomer 100 % | 198 | 198 | ∞ | ∞ | — |
| modulus lb. sq. in$^{-1}$ 200% | 520 | — | 530 | 1080 | 50 |
| modulus lb. sq. in$^{-1}$ 300% | 560 | — | 510 | 770 | — |
| modulus lb. sq. in$^{-1}$ | 550 | — | 514 | 740 | — |
| Elongation to break % | 300 | 60 | 300 | 320 | 150 |
| Tensile strength lb. sq. in$^{-1}$ | 1500 | 2200 | 1540 | 2350 | 100 |
| Permanent Set % | <5 | <5 | 15 | 75 | <5 |
| Tg °C | −49 | −49 | −49 | −49 | −49 |

EXAMPLE 2

A. The procedure of experiment A in Example 1 was repeated except that 50 parts of oxypropylated trimethylol propane, 15 parts of poly(propylene glycol), 8.5 parts of 4:4'-diphenyl methane diisocyanate, 0.2 part of dibutyl tin dilaurate, 0.1 part t-butyl peroctoate and 18.4 parts of ethylene glycol dimethacrylate were used.

The elastomeric sheet removed from the mould had the properties shown at A in the following table.

B. By way of comparison and in order to show the effect of the absence of cross-linking in the polymer of the ethylenically unsaturated monomer the procedure of experiment A above was repeated except that the ethylene glycol dimethacrylate was replaced by methyl methacrylate. The elastomeric sheet removed from the mould had the properties shown as B in the following table.

C. By way of comparison and in order to show the properties of the cross-linked elastomeric polyurethane in the absence of a polymer of an ethylenically unsaturated monomer the procedure of experiment A above was repeated except that the ethylene glycol dimethacrylate and the t-butyl peroctoate were omitted.

The properties of the amorphous elastomeric material removed from the mould are shown at C in the following table.

| Experiment | A | B | C |
| --- | --- | --- | --- |
| Weight % polyurethane | 80 | 80 | 100 |
| Weight % polymer of ethylenically unsaturated monomer | 20 | 20 | 0 |
| Mc in polymer of ethylenically unsaturated monomer | 198 | ∞ | — |
| 100% modulus lb. sq. in$^{-1}$ | 440 | 170 | 86 |
| 200% modulus lb. sq. in$^{-1}$ | 380 | 140 | 66 |
| 300% modulus lb. sq. in$^{-1}$ | 400 | 130 | 79 |
| Elongation to break % | 350 | 450 | 260 |
| Tensile strength lb. sq. in$^{-1}$ | 1510 | 700 | 161 |
| Permanent set % | <5 | 10 | <5 |
| Tg °C | −46 | −46 | −46 |

EXAMPLE 3

A. In five separate experiments 50 parts of poly(ethylene adipate) having a molecular weight of 2,000 and a hydroxyl value of 56 mg KOH g$^{-1}$, 0.7 part of trimethylol propane and 14.6 parts of ethylenically unsaturated monomer (containing 100 ppm Topanol A stabiliser) were mixed at 60° c. The ethylenically unsaturated monomer comprised either methyl methacrylate (MMA), ethylene glycol dimethacrylate (EGDM) or a mixture of MMA and EGDM. 8.6 parts of 4:4'-diphenyl methane diisocyanate, 0.1 part of t-butyl peroctoate and 0.01 part of dibutyl tin dilaurate were added to the mixture which was then degassed, charged to a mould and heated following the procedure of Example 1 experiment A.

The elastomeric materials removed from the moulds had the properties given in the following table.

| Proportion by weight MMA/EGDM | 100:0 | 90:10 | 80:20 | 50:50 | 0:100 |
| --- | --- | --- | --- | --- | --- |
| Weight % polyurethane | 80 | 80 | 80 | 80 | 80 |
| Weight % polymer of ethylenically unsaturated monomer | 20 | 20 | 20 | 20 | 20 |
| Mc in polymer of ethylenically unsaturated monomer | ∞ | 1978 | 990 | 396 | 198 |
| 100% modulus lb. sq. in$^{-1}$ | 480 | 550 | 700 | 860 | 1100 |
| 200% modulus lb. sq. in$^{-1}$ | 440 | 510 | 650 | 900 | 1200 |
| 300% modulus lb. sq. in$^{-1}$ | 600 | 660 | 1000 | 1200 | 1300 |
| Elongation to break % | 450 | 450 | 370 | 360 | 340 |
| Tensile strength lb. sq. in$^{-1}$ | 4800 | 5700 | 5030 | 5300 | 5000 |
| Permanent set % | 15 | 10 | <5 | <5 | 0 |
| Tg °C | −35 | −35 | −35 | −35 | −35 |

B. The procedure of experiment A above was repeated except that 25.4 parts of ethylenically unsaturated monomer were used in the experiments. The elastomeric materials removed from the moulds had the properties given in the following table.

| Proportion by weight MMA/EGDM | 100:0 | 90:10 | 80:20 | 50:50 | 0:100 |
| --- | --- | --- | --- | --- | --- |
| Weight % polyurethane | 70 | 70 | 70 | 70 | 70 |
| Weight % polymer of ethylenically unsaturated monomer | 30 | 30 | 30 | 30 | 30 |
| Mc in polymer of ethylenically unsaturated monomer | ∞ | 1978 | 990 | 396 | 198 |
| 100% modulus lb. sq. in$^{-1}$ | 600 | 1000 | 1300 | 2140 | 2600 |
| 200% modulus lb. sq. in$^{-1}$ | 730 | 960 | 1250 | 2060 | 2200 |
| 300% modulus lb. sq. in$^{-1}$ | 910 | 1200 | 1500 | — | — |
| Elongation to break % | 400 | 380 | 330 | 243 | 200 |
| Tensile strength lb. sq. in$^{-1}$ | 4700 | 5700 | 5700 | 6200 | 4200 |
| Permanent set % | 80 | 40 | 15 | <5 | <5 |
| Tg °C | −35 | −35 | −35 | −35 | −35 |

C. The procedure of experiment A above was repeated except that 39.4 parts of ethylenically unsaturated monomer and 0.2 part of t-butyl peroctoate were used. The elastomeric materials removed from the moulds had the properties given in the following table.

| Proportion by weight MMA/EGDM | 100:0 | 90:10 | 80:20 | 50:50 | 0:100 |
|---|---|---|---|---|---|
| Weight % polyurethane | 60 | 60 | 60 | 60 | 60 |
| Weight % polymer of ethylenically unsaturated monomer | 40 | 40 | 40 | 40 | 40 |
| Mc in polymer of ethylenically unsaturated monomer | ∞ | 1978 | 990 | 396 | 198 |
| 100% modulus lb. sq. in$^{-1}$ | 1100 | 2140 | 2700 | 4000 | — |
| 200% modulus lb. sq. in$^{-1}$ | 1360 | 2060 | 2400 | — | — |
| 300% modulus lb. sq. in$^{-1}$ | 1350 | — | — | — | — |
| Elongation to break % | 330 | 240 | 250 | 160 | 45 |
| Tensile strength lb. sq. in$^{-1}$ | 4500 | 5000 | 6000 | 5000 | 4300 |
| Permanent set % | >100 | 50 | 30 | 10 | 5 |
| Tg °C | −34 | −34 | −34 | −34 | −34 |

By way of comparison and in order to illustrate the properties of the elastomeric polyurethane prepared in the absence of an ethylenically unsaturated monomer the procedure of experiment A above was repeated except that the ethylenically unsaturated monomer and the t-butyl peroctoate were omitted and the degassed mixture was heated in a mould at 80° C for 18 hours and 115° C for 2 hours.

The crystalline elastomeric material removed from the mould had the following properties.

| | |
|---|---|
| 100% modulus lb. sq. in$^{-1}$ | 160 |
| 200% modulus lb. sq. in$^{-1}$ | 110 |
| 300% modulus lb. sq. in$^{-1}$ | 103 |
| Elongation to break % | 600 |
| Tensile strength lb. sq. in$^{-1}$ | 2000 |
| Permanent set % | 5 |

EXAMPLE 4

The procedure of Example 3A was followed in five separate experiments in each of which a mixture of 70 parts of poly(ethylene adipate), 1.34 parts of trimethylol propane having a molecular weight of 310, 10.6 parts of 4:4′-diphenylmethane diisocyanate, and 0.2 part of dibutyl tin dilaurate was made up at 60° C. In the separate experiments different amounts of a mixture made up of 200 parts of ethylene glycol dimethacrylate, 600 parts of methyl methacrylate and 16 parts of t-butyl peroctoate were added as follows: (A) 4.3 parts, (B) 21 parts, (C) 39 parts, (D) 56 parts, and (E) 84.1 parts.

Each of the mixtures was then charged to a mould as used in Example 1 and heated at 60° C for 6 hours, 90° C for 2 hours and 115° C for 2 hours.

The elastomeric materials removed from the moulds had the following properties.

| Experiment | A | B | C | D | E |
|---|---|---|---|---|---|
| Tensile strength lb. sq. in$^{-1}$ | 3270 | 3980 | 4400 | 3900 | 2980 |
| Elongation to break % | 360 | 350 | 260 | 150 | 90 |
| 300% modulus lb. sq. in$^{-1}$ | 2270 | 2840 | — | — | — |
| Permanent set at break % | 2 | 4 | 6 | 10 | 12 |
| % by weight polymer of ethylenically unsaturated monomer | 5 | 20 | 30 | 40 | 50 |
| Mc in polymer | 800 | 800 | 800 | 800 | 800 |
| Tg °C | −35 | −35 | −35 | −35 | −35 |

By way of comparison the procedure described in experiments, C, D and E was repeated except that the mould and contents were heated directly at 115° C for 2 hours in order to react the polyurethane precursors and simultaneously polymerise the ethylenically unsaturated monomer. In each comparative experiment the material removed from the mould was a very weak elastomeric material unsuitable for testing.

EXAMPLE 5

In six separate experiments mixtures of 100 parts of polytetrahydrofuran having a hydroxyl value of 56.5 mg KOH g$^{-1}$, 3 parts of oxypropylated trimethylol propane having a molecular weight of 310, 17 parts of 4:4′-diphenylmethane diisocyanate, 1 part of t-butyl peroctoate and 0.1 part of dibutyl tin dilaurate were made up at 60° C. To the mixtures the following ethylenically unsaturated monomers were added, (A) 60 parts of trimethylol propane trimethacrylate, (B) 60 parts of ethylene glycol dimethacrylate, (C) 30 parts of ethylene glycol dimethacrylate and 30 parts of methyl methacrylate, (D) 15 parts of ethylene gylcol dimethacrylate and 45 parts of methyl methacrylate, (E) 6 parts of ethylene glycol dimethacrylate and 56 parts of methyl methacrylate, and (F) (by way of comparison) 60 parts of methyl methacrylate.

Each of the resultant mixtures was degassed and charged to a mould as used in Example 1 and heated following the procedure described in Example 4.

The elastomeric materials removed from the moulds had the following properties.

| Experiment | A | B | C | D | E | F |
|---|---|---|---|---|---|---|
| % by weight of polymer of ethylenically unsaturated monomer | 33.3 | 33.3 | 33.3 | 33.3 | 34 | 33.3 |
| 300% modulus lb. sq. in$^{-1}$ | — | — | 5400 | 4050 | 3700 | 2130 |
| Elongation at break % | 200 | 250 | 310 | 350 | 380 | 410 |
| Tensile Strength lb. sq. in$^{-1}$ | 3260 | 3620 | 5680 | 5250 | 5100 | 3550 |
| Permanent set at break % | 1 | 2 | 4 | 14 | 18 | 38 |
| Mc | 169 | 200 | 400 | 800 | 2060 | ∞ |
| Tg °C | −52 | −52 | −52 | −52 | −52 | −52 |

In six further experiments the procedure of experiments A to F above was repeated except that only two-thirds of the amounts of the ethylenically unsaturated monomers used in experiments A to F was used. The elastomeric materials removed from the moulds had the following properties.

| Experiment | G | H | I | J | K | L |
|---|---|---|---|---|---|---|
| % by weight of polymer of ethylenically unsaturated monomer | 25 | 25 | 25 | 25 | 25.5 | 25 |
| 300% modulus lb. sq. in$^{-1}$ | — | — | 4260 | 2550 | 1450 | 1150 |
| Elongation at break % | 200 | 230 | 350 | 400 | 400 | 420 |
| Tensile strength lb. sq. in$^{-1}$ | 2700 | 2900 | 5320 | 4610 | 3130 | 2630 |
| Permanent set at break % | 0 | 2 | 3 | 10 | 14 | 16 |
| Mc | 169 | 200 | 400 | 800 | 2060 | ∞ |
| Tg °C | −52 | −52 | −52 | −52 | −52 | −52 |

EXAMPLE 6

120 parts of poly(ethylene adipate) as used in Example 3, 3 parts of oxypropylated trimethylol propane of molecular weight 310, 19.4 parts of 4:4'-diphenylmethane diisocyanate, 23 parts of t-butyl styrene, 10.6 parts of ethyl vinyl benzene, 12.4 parts of divinyl benzene, 0.5 part of t-butyl perbenzoate and 0.2 part of dibutyl tin dilaurate were mixed at 60° C, degassed and charged to a mould as used in Example 1, and heated at 100° C for 2 hours and 130° C for 18 hours.

The elastomeric material removed from the mould had the following properties.

| | |
|---|---|
| % by weight polymer of ethylenically unsaturated monomer | 24.5% |
| 300% modulus lb. sq. in$^{-1}$ | 1200 |
| Elongation at break % | 680 |
| Tensile strength lb. sq. in$^{-1}$ | 5270 |
| Mc | 486 |
| Tg °C | −35 |

EXAMPLE 7

A. 200 parts of a triol having a molecular weight of 5,250 (Daltocel T32/75 Imperial Chemical Industries Limited) and 100 parts of finely divided precipitated calcium carbonate were mixed on a three-roll mill. 150 parts of the resultant mixture were mixed with 5.2 parts of hexamethylene diisocyanate, 0.2 part of dibutyl tin dilaurate, 20 parts of ethylene glycol dimethacrylate, 20 parts of methyl methacrylate, 0.8 part of t-butyl peroctoate and 0.01 part of hydroquinol and the mixture was degassed, charged to a mould as used in Example 1 and heated for 2 hours at 110° C. The elastomeric material removed from the mould had the properties shown at A in the following table.

B. By way of comparison the procedure of Experiment A above was followed except that the ethylene glycol dimethacrylate, methyl methacrylate, t-butyl peroctoate and hydroquinol were omitted.

The properties of the elastomeric material removed from the mould are shown at B in the following table.

| Experiment | A | B |
|---|---|---|
| Elongation to break % | 250 | 150 |
| Tensile strength lb. sq. in$^{-1}$ | 2000 | 200 |
| % by weight of polymer of ethylenically unsaturated monomer | 27.5 | 0 |
| Mc | 400 | — |
| Tg °C | −52 | −54 |

What we claim is:

1. In a process for the production of an elastomeric material from a homogeneous composition comprising from 50% to 95% by weight of the precursors of a cross-linked polyurethane which, when reacted alone in the absence of ethylenically unsaturated material, are capable of forming an elastomeric polyurethane having a glass-rubber transition temperature of 25° C or less, and from 50% to 5% by weight of at least one polymerisable ethylenically unsaturated material, in which process the reaction of the polyurethane precursors is substantially completed before polymerisation of the ethylenically unsaturated material is allowed to proceed to the extent that the polymer so produced forms a separate phase and in which polymerisation of the ethylenically unsaturated material is thereafter completed, the improvement which comprises using in the process an ethylenically unsaturated material which contains at least one polyfunctional ethylenically unsaturated material and is selected so as to produce, after polymerisation, a cross-linked polymer having on average a molecular weight between cross-links of not greater than 2,500.

2. A process as claimed in claim 1 in which the precursors of the cross-linked polyurethane are free of groups reactive with the ethylenically unsaturated material.

3. A process as claimed in claim 1 in which the ethylenically unsaturated material comprises at least one polyfunctional ethylenically unsaturated monomer.

4. A process as claimed in claim 3 in which the ethylenically unsaturated material comprises a mixture of at least one monofunctional ethylenically unsaturated monomer and at least one polyfunctional ethylenically unsaturated monomer.

5. A process as claimed in claim 1 in which the composition comprises greater than 70% and less than 90% by weight of the precursors of a cross-linked polyurethane.

6. A process as claimed in claim 1 in which the precursors of the cross-linked polyurethane are capable of forming an elastomeric polyurethane having a glass-rubber transition temperature of 0° C or less.

7. A process as claimed in claim 1 in which the ethylenically unsaturated material is selected so as to produce, after polymerisation, a cross-linked polymer having on average a molecular weight between cross-links in the range 100 to 2,000.

8. A process as claimed in claim 7 in which the ethylenically unsaturated material is selected so as to produce, after polymerisation, a cross-linked polymer having a molecular weight between cross-links in the range 100 to 1,000.

9. A process as claimed in claim 1 in which the polyfunctional ethylenically unsaturated material comprises at least one monomer which is an acrylate or methacrylate bis-ester of a diol.

10. A process as claimed in claim 9 in which the acrylate or methacrylate bis-ester of a diol is ethylene glycol dimethacrylate.

* * * * *

UNITED STATES PATENT OFFICE
CERTIFICATE OF CORRECTION

Patent No. 3,868,431          Dated February 25, 1975

Inventor(s) Francis Gowland Hutchinson

It is certified that error appears in the above-identified patent and that said Letters Patent are hereby corrected as shown below:

In the heading of the patent, add priority data as follows:

-- [30]  Foreign Application Priority Data

May 16, 1972    Great Britain....22849/72--

Signed and sealed this 27th day of May 1975.

(SEAL)
Attest:

RUTH C. MASON
Attesting Officer

C. MARSHALL DANN
Commissioner of Patents
and Trademarks